E. T. EARL.

VENTILATOR AND COMBINED VENTILATOR AND REFRIGERATOR CAR.

No. 11,324. Reissued Apr. 18, 1893.

Witnesses.

M. M. Lee.

Alfred S. Townsend

Inventor.

Edwin T. Earl by Hazard & Townsend his Attys

UNITED STATES PATENT OFFICE.

EDWIN T. EARL, OF LOS ANGELES, CALIFORNIA.

VENTILATOR AND COMBINED VENTILATOR AND REFRIGERATOR-CAR.

SPECIFICATION forming part of Reissued Letters Patent No. 11,324, dated April 18, 1893.

Original No. 465,615, dated December 22, 1891. Application for reissue filed January 17, 1893. Serial No. 458,744.

*To all whom it may concern:*

Be it known that I, EDWIN T. EARL, a citizen of the United States, residing at Los Angeles, in the county of Los Angeles and State of California, have invented a new and useful Ventilator and Combined Ventilator and Refrigerator-Car, of which the following is a specification, reference being had to the accompanying drawings, in which—

Figure 1:
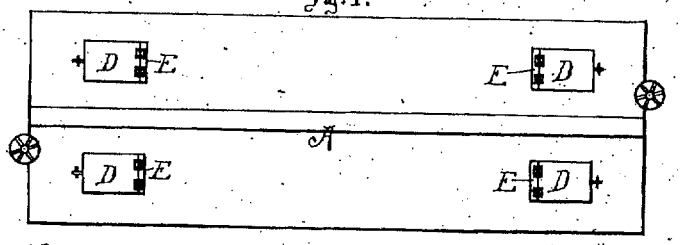
Figure 2:
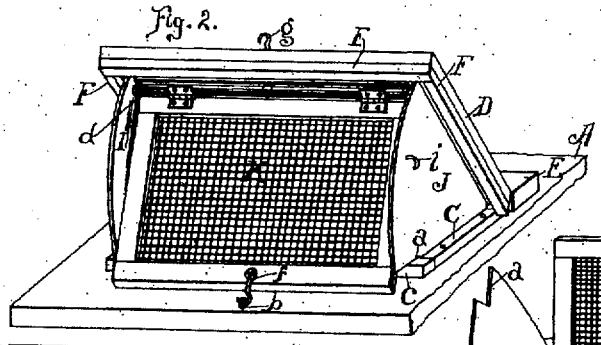
Figure 3:
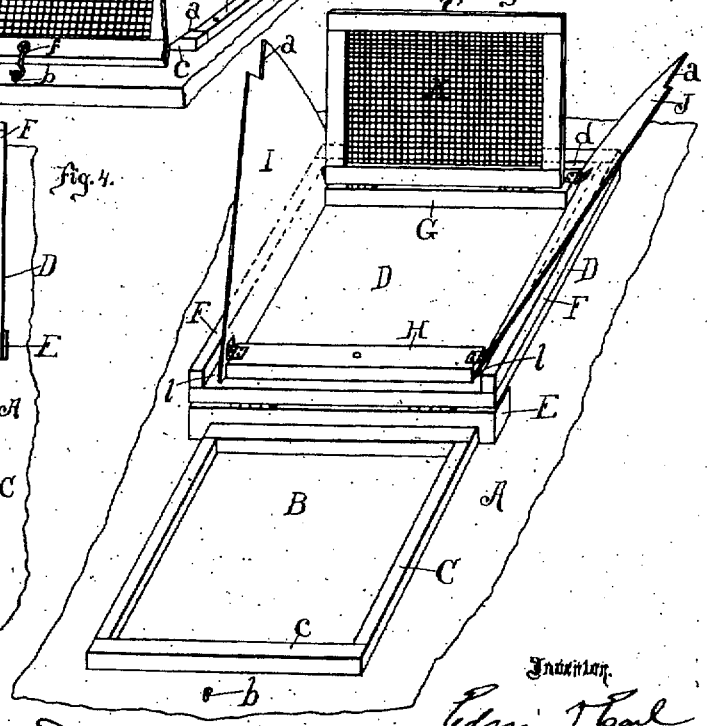
Figure 4:
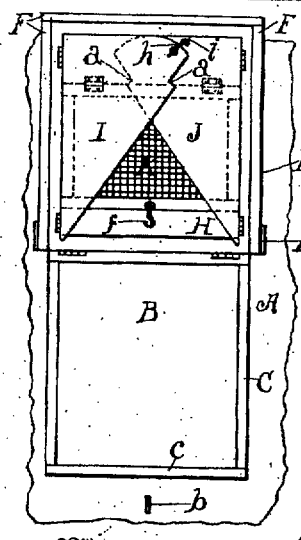

Figure 1 is a top view of a railroad-car provided with my invention as it appears when the ventilators are closed. Fig. 2 is a perspective front view of the ventilator erect or open. Fig. 3 shows the ventilator-cover thrown back to allow free access to the ice-box or opening. Fig. 4 shows the cover, side wings, and screen folded preliminary to closing the ventilator.

Prior to my present invention, refrigerator cars were provided with outside ice hole doors, some of which were hinged to open transverse the roof of the car and others were hinged to open longitudinal the roof of the car.

So far as I am aware the first use of the ice-holes of a car to transform a refrigerator car into a ventilated car was made by me in February, 1886, by throwing the outside ice-hole doors back upon the roof, but this was objectionable because the openings could not be easily seen and the train-men were liable to step into them. To prevent the train-men closing the ice-holes I caused the doors to be nailed down to the roof of the car when they were thrown back. This also proved very objectionable, as it mutilated the door and the roof of the car. The danger of stepping into these open ice-holes was obviated by a device in which screens were placed over the holes, flush with the mouths thereof, level with the roof of the car, and bolts or bars were provided to hold the doors in their open position when lying back upon the roof of the car. However, the ventilation produced by these open ice-holes, the doors of which were thrown back upon the roof of the car, was not perfect, as there was nothing to catch the air and deflect it and direct it into the car.

The object of my invention is to provide the ordinary refrigerator car with ventillators of great simplicity which when not in use will not be in the way of the train-men, and which when in use will avoid all danger to the train-men, and will also serve, when the car is in motion, to deflect and direct the air down into the car at one end thereof, and will also serve to create a draft to draw the air out at the other end of the car. This I accomplish by opening the outside ice-hole door toward the end of the car at an angle of about forty-five degrees, and securing the door in this position by suitable means. The door so adjusted arrests the air and deflects it down into the car, and it also forms a conspicuous object easily seen by the train-men, and it also partially covers the ice-hole opening into the car and thus prevents the train-men stepping into the hole, and when not in use for ventilation, the ventilator can be folded down to close the ice-hole in the ordinary manner. The door thus not only serves to close the ice-hole but serves the purpose of a ventilator.

While the specific form of folding ventilator herein shown and described is designed especially to be used in connection with the ice-holes of refrigerator cars, it can also be applied to refrigerator cars independent of such ice-holes by providing openings in the roof specially for the ventilator, which open directly into the body of the car instead of into the ice-tanks.

My present invention, broadly stated, consists in the combination with a car having separate and independent openings, of a lid or cover for each opening adapted to close the latter, and means for holding the lids open in oppositely inclined positions whereby said lids are adapted not only to form closures for the openings, but also to act as funnels to insure a circulation of air within the car.

It also embraces a ventilator for a refrigerator car consisting in the outside ice-hole door, hinged to the top of the car so as to fold down upon the car, lengthwise of the car, and close the ice-hole, and means adapted and arranged to hold the ice-hole door open at an angle of about forty-five degrees, and to allow the door to fold down to close the ice-hole.

My invention comprises certain improvements in ventilating apparatus and also the combination of such apparatus with a railroad-car or like receptacle for perishable articles.

My folding ventilator may be applied to ordinary doors attached to the openings in cars, buildings or vessels. It is designed especially for application to the ice-hole doors of refrigerator-cars.

All refrigerator-cars are constructed with ice-holes in the roof, through which ice is placed in the ice-tanks of the cars. These ice-tanks open into the interior of the cars, and the ice-holes are always closed with an ordinary door, which is generally hinged to the roof, as above stated. Sometimes there is an inside plug, which, when my folding ventilator is used, may be removed and placed inside the car near the side doors, to be replaced in the ice-holes when it is necessary to close them and insulate the car.

Refrigerator-cars are constructed with heavy walls, and therefore the contents are well protected from cold weather. As refrigerator-cars are now constructed they may be used as winter cars by simply closing the ice-hole doors and the side doors, or they may be used as summer cars by charging the ice-tanks with ice, and thus keeping the contents cool.

My folding ventilator, when applied to the ice-hole doors of refrigerator-cars, will make these cars available as ventilated cars, of a thoroughly practical character and will enable the shipper to use the car on the same trip as a perfect ventilated car as well as an insulated car to protect the contents from damage by cold weather, or as a refrigerator-car, when the ice-tanks are charged with ice, to protect the contents from heating. The folding ventilator will therefore be particularly desirable in the transportation of California oranges, &c., during the winter months, when it is necessary to use a car which will provide ventilation a portion of the distance through the warm climate through which the car passes during the first few days of the journey. After it reaches the cold climate, which is found a few hundred miles east of California, then my folding ventilator may be folded together and the ice-hole doors securely closed to keep out the cold air, and from that time on the car is an insulated car and the contents are thoroughly protected from injury by cold weather. Later in the season when the weather is warmer east, refrigerator-cars with my folding ventilator attachment may be used simply as ventilated cars to destination. This will avoid the necessity of providing a different kind of a car to be used as a ventilated car in the spring of the year, and will enable the railroad transportation companies to use their refrigerator cars from the beginning to the end of the season, which is not possible as they are now constructed, since there is no device whereby a thorough circulation of air can be provided.

The roofs of refrigerator-cars are ordinarily provided with one or more ice-holes at each end.

My folding ventilator may be applied to the outside ice-hole door of any refrigerator car. When so applied my folding ventilator comprises the outside ice-hole door partially opened toward the end of the car at an angle of about forty-five degrees, the opening thus formed being preferably closed on each side by a wing formed by a piece of galvanized sheet-iron or other material, extending from the under side of the ice-hole door to the top of the car on each side of the ice-hole. At the front end of the car these side pieces or wings, together with the outside door of the ice-hole, form a scoop which catches the air at the front end of the car when it is in motion and deflects and directs the air down into the car. The ice-hole door when adjusted at this angle, without the side wings, serves this office in a degree, but the addition of the side wings greatly increases its efficiency, and the device as shown is complete within itself, the side wings forming a desirable means for holding the door in its elevated position.

In practice, the ice-hole doors at the front and rear ends of the car are open with my ventilator attached, the front ones to receive the air and force it into the car, and the rear ones to permit an exit for the air after it has passed through the car. The front of the opening formed by the outside ice-hole door and the two side pieces above referred to are screened, so that cinders and sparks cannot enter the ice-hole and cause damage to the contents of the car by fire. This screen is fastened by hinges to the under face of the lid or door of the ice-hole about ten inches back from the front edge, and when the ventilator is open the lower edge of this screen door is fastened to a staple in the roof of the car on the outside of the ice-hole, which staple is also used to fasten the outside ice-hole door when the ice-hole is closed. The cinders and sparks striking against the wire-screen will be arrested from entering the car and will fall outside the ice-holes.

A feature of my invention consists in having the side pieces, the combination of which with the lid forms the scoop, fastened to the under face of the ice-hole door by hinges, and the screen which extends across the mouth of the scoop is also fastened to the under face of the ice-hole door by hinges, so that when the ventilator is not used, the side pieces and the end screen can be folded down and fastened to the under face of the ice-hole door, and the door can then be closed and the car thoroughly insulated. The same device may be applied to the hatches of a vessel or to openings in the roof of a building, and when not required for ventilation can be folded together and the door to such openings securely closed.

This folding ventilator is particularly valuable in connection with refrigerator-cars, as by applying the same to the ice-holes, refrigerator cars may be transformed into ventilated cars without great expense and in a thoroughly practical manner. As no such device has ever been applied to ice-holes of refrigerator-cars, I wish the patent to cover any similar device which may be applied to ice-holes whereby the refrigerator-car is transformed into a ventilated car. The application of the side pieces and the screen may be made differently and at the same time the idea will be the same, and the refrigerator car may be transformed into a ventilated car by other air deflecting contrivances covering the ice-holes, independently of the ordinary outside ice-hole doors.

In the drawings, A represents the roof or top of a car provided with the opening or ice-hole B and with the raised cleat-frame C surrounding the opening or ice-hole. The lid or cover D is hinged to the roof or top of the car through the medium of the hinge-cleat E, and is provided on the inner side upon all but the hinged edge with the face-flanges F, arranged to fit the cleat-frame. The inside, front and rear hinge-cleats G H are secured to the lid with a space between them to receive the screen. The rearwardly-tapering side wings I J are hinged to the under face of the lid through the medium of the hinge-cleats G H, and the screen K is hinged to the front end inside of the under face of the lid through the medium of the hinge-cleat G.

To open the ventilator the front end of the lid is raised and the side wings I J and the screen are unfolded and adjusted to rest upon the top of the car. The tapering side wings are arranged to fit within the cleat-frame and the screen is arranged to fit between them and to slant forward to rest upon the top of the car. The screen is hinged to the lid at such a distance from the front end of the lid as to provide for a projecting ledge or hood *d* in front of the screen, and the side wings I J are of such length as to project in front of the screen at the sides thereof to form a kind of funnel to direct the air into the ventilator. The tapering side wings are respectively provided with the notch or recess *a* at their lower front corners to fit upon the front member *c* of the cleat-frame. The screen is provided with suitable means—such as the hook *f*—for fastening its lower end to the car by staple *b*. The lid is also provided with means for fastening it to the car, such as the hook *g*, arranged to hook into the staple *b*, arranged to receive the hook *f*. When the wings and screen are in place, as shown in Fig. 2, to form the ventilator, the whole may be securely locked, if desired. In such case a hasp is used in place of the hook.

By the arrangement shown, I avoid all danger of clogging the ventilator by reason of the cinders; the inclined screen causing them to slide down and be discharged outside of the ventilator.

When the wings are folded upon the screen, they are secured to each other by suitable means, such as the hook *h* and staple *i*, and a channel *l* is formed between the face-flange F and the folded screen and wings to chamber the cleat-frame C when the lid is closed, thus making a tight joint to exclude the air.

It is to be understood that I do not limit my claim to the specific form shown.

Now, having described my invention, what I claim as new, and desire to secure by Letters Patent, is—

1. In combination with a car having separate and independent openings; a lid or cover for each opening, adapted to close the latter; and means for holding the lids open in oppositely-inclined positions, whereby said lids are adapted not only to form closures for the openings, but also to act as funnels to insure a circulation of the air within the car.

2. In combination with a car having separate and independent openings; a lid or cover for each opening, adapted to close the latter; and means carried by the respective lids for holding them open in oppositely-inclined positions.

3. In combination with a car having separate and independent openings; a lid or cover for each opening adapted to close the latter; and foldable devices substantially such as shown and described for holding the lids open in oppositely-inclined directions.

4. In combination with a car having separate and independent openings; movable covers or lids adapted to close such openings; and side wings hinged to such lids or covers and adapted to sustain them in oppositely-inclined positions and to form in connection with the lids a funnel.

5. In a car-ventilator, the combination, with the lid hinged at one end, of the screen hinged to the opposite end of the lid and the wings hinged to the lid near its side edges.

6. In a car-ventilator, the combination, with the lid hinged at one end, of the screen hinged to the opposite end of the lid and the wings hinged to the lid near its side edges, said wings tapering, as shown, and provided with notches at their larger ends, substantially as set forth.

7. In combination with a car provided with openings in its roof and with hinged lids adapted to cover the openings, the side wings hinged to the lids near the side edges of the latter, said wings tapering toward the middle of the car, substantially as and for the purpose set forth.

8. In combination with a car provided with openings in its roof and with hinged lids adapted to cover the openings, the side wings hinged to the lids near the side edges of the latter, and the screens hinged to the free ends of the lids, all substantially as shown and described.

9. The combination of the roof provided with the opening, the raised cleat-frame surrounding the opening, the raised hinge-cleat, the lid hinged to the roof and provided with the face-flanges arranged to fit the cleat-frame, the hinge-cleats secured to the under face of the lid with a space between them, the tapering side wings hinged to the under face of the lid, and the screen hinged to the under face of the lid, as set forth.

EDWIN T. EARL.

Witnesses:
JAMES R. TOWNSEND,
F. J. HARRIGAN,
W. F. SHELLEY.

DISCLAIMER.

11,894, (Reissue.)—*Edwin T. Earl*, Los Angeles, Cal. IMPROVEMENT IN VENTILATOR AND COMBINED VENTILATOR AND REFRIGERATOR CAR. Patent dated April 18, 1896. Disclaimer filed March 5, 1904.

Enters his disclaimer to such parts of the thing patented and to so much of the specification and the first and second claims as does or might make such claims apply to any car except a combined ventilator and refrigerator car having in its roof at its opposite ends separate and independent ice-holes and lids for closing the same; and by this disclaimer the paragraph comprising lines 88 to 90, inclusive, page 1 of the specification, is amended to read as follows:

My present invention comprises a combined ventilator and refrigerator car having in its roof at its opposite ends separate and independent ice-holes, a lid or cover for each of such ice-holes, adapted to close the latter, and means for holding the lids open in oppositely-inclined positions, whereby said lids are adapted not only to form closures for the ice-holes, but also to act to deflect and direct air down into said ice-holes, as and for the purpose herein specified.

Lines 14 to 17, inclusive, and last three words of line 18 of page 3 of the specification are hereby canceled—to wit, the words:

and the refrigerator-car may be transformed into a ventilated car by other air-deflecting contrivances covering the ice-holes independently of the ordinary outside ice-hole doors.

Claim 1 is hereby amended so as to read as follow

1. The combined ventilator and refrigerator car set forth, comprising a refrigerator-car having in its roof at its opposite ends separate and independent ice-holes, a lid or cover for each of such ice-holes, adapted to close the latter, and means for holding the lids open in oppositely-inclined positions, whereby said lids are adapted not only to form closures for the ice-holes, but also to act to deflect and direct air down into said ice-holes, as and for the purpose specified.

Claim 2 is disclaimed in so far as it is not fully covered by said claim 1 as amended by this disclaimer, and is therefore hereby canceled for lack of patentable novelty over said claim 1.

9. The combination of the roof provided with the opening, the raised cleat-frame surrounding the opening, the raised hinge-cleat, the lid hinged to the roof and provided with the face-flanges arranged to fit the cleat-frame, the hinge-cleats secured to the under face of the lid with a space between them, the tapering side wings hinged to the under face of the lid, and the screen hinged to the under face of the lid, as set forth.

EDWIN T. EARL.

Witnesses:
JAMES R. TOWNSEND,
F. J. HARRIGAN,
W. F. SHELLEY.

DISCLAIMER.

11,894, (Reissue.)—*Edwin T. Earl*, Los Angeles, Cal. IMPROVEMENT IN VENTILATOR AND COMBINED VENTILATOR AND REFRIGERATOR CAR. Patent dated April 18, 1896. Disclaimer filed March 5, 1904.

Enters his disclaimer to such parts of the thing patented and to so much of the specification and the first and second claims as does or might make such claims apply to any car except a combined ventilator and refrigerator car having in its roof at its opposite ends separate and independent ice-holes and lids for closing the same; and by this disclaimer the paragraph comprising lines 88 to 90, inclusive, page 1 of the specification, is amended to read as follows:

My present invention comprises a combined ventilator and refrigerator car having in its roof at its opposite ends separate and independent ice-holes, a lid or cover for each of such ice-holes, adapted to close the latter, and means for holding the lids open in oppositely-inclined positions, whereby said lids are adapted not only to form closures for the ice-holes, but also to act to deflect and direct air down into said ice-holes, as and for the purpose herein specified.

Lines 14 to 17, inclusive, and last three words of line 18 of page 3 of the specification are hereby canceled—to wit, the words:

and the refrigerator-car may be transformed into a ventilated car by other air-deflecting contrivances covering the ice-holes independently of the ordinary outside ice-hole doors.

Claim 1 is hereby amended so as to read as follow

1. The combined ventilator and refrigerator car set forth, comprising a refrigerator-car having in its roof at its opposite ends separate and independent ice-holes, a lid or cover for each of such ice-holes, adapted to close the latter, and means for holding the lids open in oppositely-inclined positions, whereby said lids are adapted not only to form closures for the ice-holes, but also to act to deflect and direct air down into said ice-holes, as and for the purpose specified.

Claim 2 is disclaimed in so far as it is not fully covered by said claim 1 as amended by this disclaimer, and is therefore hereby canceled for lack of patentable novelty over said claim 1.